(12) United States Patent
Imafuku et al.

(10) Patent No.: US 10,693,258 B2
(45) Date of Patent: Jun. 23, 2020

(54) SUBMERSIBLE MOTOR AND WATERPROOF CONNECTOR

(71) Applicant: EBARA CORPORATION, Tokyo (JP)

(72) Inventors: Masaaki Imafuku, Tokyo (JP); Takuro Watanabe, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 16/340,591

(22) PCT Filed: Nov. 22, 2017

(86) PCT No.: PCT/JP2017/041995
§ 371 (c)(1),
(2) Date: Apr. 9, 2019

(87) PCT Pub. No.: WO2018/097175
PCT Pub. Date: May 31, 2018

(65) Prior Publication Data
US 2019/0267752 A1    Aug. 29, 2019

(30) Foreign Application Priority Data

Nov. 22, 2016  (JP) .................................. 2016-226860
Nov. 22, 2016  (JP) .................................. 2016-226861

(51) Int. Cl.
*H01R 13/40* (2006.01)
*H01R 13/523* (2006.01)
(Continued)

(52) U.S. Cl.
CPC ......... *H01R 13/523* (2013.01); *E21B 17/028* (2013.01); *H01R 13/52* (2013.01);
(Continued)

(58) Field of Classification Search
CPC ........ H01R 13/523; H02K 5/22; E21B 17/028
(Continued)

(56) References Cited

U.S. PATENT DOCUMENTS 2,233,890 A * 3/1941 Hoover ................. E21B 17/026
                                                              174/8
3,980,369 A * 9/1976 Panek .................... E21B 17/028
                                                              439/204
(Continued)

FOREIGN PATENT DOCUMENTS

JP    S61-147570 U    9/1986
JP    H05-190242 A    7/1993
(Continued)

OTHER PUBLICATIONS

International Search Report Issued in Patent Application No. PCT/JP2017/041995 dated Feb. 13, 2018.
(Continued)

*Primary Examiner* — Abdullah A Riyami
*Assistant Examiner* — Vladimir Imas
(74) *Attorney, Agent, or Firm* — Pearne & Gordon LLP

(57) ABSTRACT

The present invention relates to a high-voltage submersible motor and a waterproof connector for use in the submersible motor. The submersible motor includes a motor body (36), a power cable (37*a*), a cable contact (50) electrically connected to the power cable (37*a*), a cable-side insulating member (49) to which the cable contact (50) is liquid-tightly coupled, a motor contact (42) connected to the cable contact (50), a motor-side insulating member (41) to which the motor contact (42) is liquid-tightly coupled, and an insulating resin (93) that fills an enclosed space (60) formed between the cable-side insulating member (49) and the motor-side insulating member (41). A connecting portion of the cable contact (50) and the motor contact (42) is covered with the resin (93).

12 Claims, 12 Drawing Sheets

(51) Int. Cl.
*E21B 17/02* (2006.01)
*H01R 13/52* (2006.01)
*H02K 5/22* (2006.01)

(52) U.S. Cl.
CPC ....... *H01R 13/521* (2013.01); *H01R 13/5216* (2013.01); *H02K 5/22* (2013.01); *H02K 5/225* (2013.01); *H01R 13/5205* (2013.01)

(58) Field of Classification Search
USPC .......................................................... 439/589
See application file for complete search history.

(56) References Cited

U.S. PATENT DOCUMENTS

| | | | | |
|---|---|---|---|---|
| 4,053,196 A * | 10/1977 | Dunaway | ............. | H01R 13/523 |
| | | | | 310/68 R |
| 4,767,356 A * | 8/1988 | Grappe | ................ | H01R 13/523 |
| | | | | 439/279 |
| 5,011,432 A * | 4/1991 | Sucht | ....................... | H01R 9/05 |
| | | | | 439/584 |
| 5,801,465 A * | 9/1998 | Yamada | ............... | H01R 13/523 |
| | | | | 174/77 R |
| 6,700,252 B2 * | 3/2004 | Fleshman | .............. | H02K 5/132 |
| | | | | 310/254.1 |
| 6,750,574 B2 * | 6/2004 | Okazaki | .................. | H02K 3/50 |
| | | | | 310/68 B |
| 6,899,532 B2 * | 5/2005 | Eddy | ................. | H01R 13/5219 |
| | | | | 310/71 |
| 6,910,870 B2 * | 6/2005 | Ebner | ..................... | F04D 13/10 |
| | | | | 166/65.1 |
| 7,695,300 B2 * | 4/2010 | Leccia | ..................... | H01H 9/02 |
| | | | | 439/263 |
| 7,828,573 B2 * | 11/2010 | Butaud | ................. | H01R 13/523 |
| | | | | 439/278 |
| 7,854,629 B1 * | 12/2010 | Albers | .................. | E21B 17/023 |
| | | | | 439/271 |
| 7,942,696 B2 * | 5/2011 | Watson | ................. | E21B 17/023 |
| | | | | 439/589 |
| 7,973,240 B2 * | 7/2011 | Corren | .................... | F16L 39/00 |
| | | | | 174/84 R |
| 8,910,718 B2 * | 12/2014 | Watson | ................. | E21B 43/128 |
| | | | | 166/105 |
| 9,331,420 B2 * | 5/2016 | Bedell | ...................... | F04B 39/12 |
| 9,343,941 B2 * | 5/2016 | Okamoto | ........... | H01R 13/5202 |
| 9,353,766 B2 * | 5/2016 | Petrucci | ................. | F04D 29/426 |

FOREIGN PATENT DOCUMENTS

| | | |
|---|---|---|
| JP | H07-153523 A | 6/1995 |
| JP | H09-74709 A | 3/1997 |
| JP | H10-284170 A | 10/1998 |
| JP | H11-243659 A | 9/1999 |

OTHER PUBLICATIONS

Opinion Issued in Patent Application No. PCT/JP2017/041995 dated Feb. 13, 2018.

* cited by examiner

SUBMERSIBLE MOTOR AND WATERPROOF CONNECTOR

TECHNICAL FIELD

The present invention relates to a submersible motor and a waterproof connector, and more particularly to a high-voltage submersible motor and a waterproof connector for use in the submersible motor.

BACKGROUND ART

Upon recent abnormal weather or a disaster such as a typhoon or a flood, conventional land-based pumps sometimes cannot be operated when they are required to work. Introduction of submersible pumps, which can be operated even when they are submerged, is a conceivable countermeasure, and replacement of a land-based pump with a submersible pump at the time of pump replacement is increasing these days.

The introduction of a submersible pump necessitates the use of a submersible motor having an unprecedentedly large capacity. In particular, some overseas rivers and drainage pump stations are of a large scale and, in most cases, a high-power (1 MW-class) submersible motor is used for them.

Submersible motors are becoming higher-voltage ones with the progress toward higher-power submersible pumps. This is because of the following disadvantages of low-voltage submersible motors: In order to pass a high current through a submersible motor, it is necessary to use a large-sized cable to connect the motor body of the submersible motor with a power source. The use of a large-sized cable involves an increased cable cost and an increased cable weight and, in addition, may necessitate the use of a special cable. Such a cable is difficult to handle. Further, a large voltage drop will occur in such a submersible motor. This requires increase in the size of a cable and increase in the starting capacity of the submersible motor. Thus, the size of a generator and the size of a transformer must be increased and, accordingly, the size of a facility and the size of a breaker must be increased. Furthermore, the use of such a submersible motor necessitates a large-sized connecting portion of the motor body and a cable, leading to a difficult connecting operation.

High-voltage submersible motors, on the other hand, have the following advantages: A high-voltage submersible motor can reduce an electric current, and therefore can reduce the size of a cable. Further, a high-voltage submersible motor can reduce a voltage drop, and therefore can reduce the starting capacity. This enables a reduction in the size of a facility and the size of a breaker. In addition, the use of such a submersible motor can reduce the size of a connecting portion of the motor body and a cable, thereby reducing the cost of the submersible motor and facilitating a connecting operation.

There is known a submersible motor of the type that electrically connects a cable to the motor body via a waterproof connector. FIG. 13 is a diagram showing a connector-type submersible motor. As shown in FIG. 13, a cable 137 is connected to a waterproof connector 146. The cable 137 is composed of a power cable 137a and an earth cable 137b. The power cable 137a and the earth cable 137b are connected to a cable contact 150 and an earth contact 151, respectively.

The waterproof connector 146 includes an insulator 149 to which the cable contact 150 and the earth contact 151 are liquid-tightly connected, and a conductive cover member 148 to which the insulator 149 is liquid-tightly connected. A lead wire 145 is connected to a motor body 136, while the lead wire 145 is connected to a motor contact 142. The motor contact 142 is liquid-tightly connected to an insulator 141 which in turn is liquid-tightly connected to a motor casing 140. When the cable contact 150 is connected to the motor contact 142, power is supplied from a power source to the motor body 136 through the cable 137 and the lead wire 145.

CITATION LIST

Patent Literature

Patent document 1: Japanese laid-open patent publication No. H9-74709

Patent document 2: Japanese laid-open utility model publication No. S61-147570

SUMMARY OF INVENTION

Technical Problem

However, as shown in FIG. 13, the connecting portion of the contacts 142, 150 is located in a space 160 formed between the insulator 141 and the insulator 149. Thus, the contacts 142, 150 are exposed in the space 160. Therefore, upon supply of power to the motor body 136, there is a fear of the occurrence of a discharge phenomenon in the space 160 in which the connecting portion (exposed portions) of the contacts 142, 150 is located. This may result in the occurrence of an electrical leakage accident.

The present invention has been made in view of the above prior-art problems. It is therefore an object of the present invention to provide a submersible motor and a waterproof connector which can prevent an electrical leakage accident.

Solution to Problem

In one embodiment, a submersible motor comprises: a motor body; a power cable for supplying power to the motor body; a cable contact electrically connected to the power cable; a cable-side insulating member to which the cable contact is liquid-tightly coupled; a motor contact connected to the cable contact; a motor-side insulating member to which the motor contact is liquid-tightly coupled; and an insulating resin that fills an enclosed space formed between the cable-side insulating member and the motor-side insulating member, wherein a connecting portion of the cable contact and the motor contact is covered with the resin.

In a preferred embodiment, the submersible motor further comprises a conductive cover member to which the cable-side insulating member is liquid-tightly coupled and which has a resin injection hole communicating with the enclosed space.

In a preferred embodiment, the conductive cover member includes an intermediate member to which the motor-side insulating member is liquid-tightly coupled, and the resin injection hole is formed in the intermediate member.

In another embodiment, a waterproof connector comprises: a cable contact which is electrically connectable to a power cable; a cable-side insulating member to which the cable contact is liquid-tightly coupled; a motor contact which is connectable to the cable contact; a motor-side insulating member to which the motor contact is liquid-tightly coupled; and an insulating resin that fills an enclosed space formed between the cable-side insulating member and the motor-side insulating member, wherein a connecting portion of the cable contact and the motor contact is covered with the resin.

In a preferred embodiment, the submersible motor further comprises a conductive cover member to which the cable-side insulating member is liquid-tightly coupled and which has a resin injection hole communicating with the enclosed space.

In a preferred embodiment, the conductive cover member includes an intermediate member to which the motor-side insulating member is liquid-tightly coupled, and the resin injection hole is formed in the intermediate member.

In yet another embodiment, a submersible motor comprises: a motor body; a power cable for supplying power to the motor body; a cable contact electrically connected to the power cable; a cable-side insulating member to which the cable contact is liquid-tightly coupled; a motor contact connected to the cable contact; a motor-side insulating member to which the motor contact is liquid-tightly coupled; and an insulating enclosure disposed in an enclosed space formed between the cable-side insulating member and the motor-side insulating member, wherein the enclosure surrounds those exposed portions of the cable contact and the motor contact which are located in the enclosed space.

In a preferred embodiment, one end of the enclosure is detachably connected to the cable-side insulating member, while the other end of the enclosure is detachably connected to the motor-side insulating member.

In a preferred embodiment, the enclosure is made of an insulating elastic material. In a preferred embodiment, the enclosure has a labyrinth structure comprising at least a first enclosure portion extending from the cable-side insulating member toward the motor-side insulating member, and a second enclosure portion extending from the motor-side insulating member toward the cable-side insulating member.

In yet another embodiment, a waterproof connector comprises: a cable contact which is electrically connectable to a power cable; a cable-side insulating member to which the cable contact is liquid-tightly coupled; a motor contact which is connectable to the cable contact; a motor-side insulating member to which the motor contact is liquid-tightly coupled;

and an insulating enclosure disposed in an enclosed space formed between the cable-side insulating member and the motor-side insulating member, wherein the enclosure surrounds those exposed portions of the cable contact and the motor contact which are located in the enclosed space.

In a preferred embodiment, one end of the enclosure is detachably connected to the cable-side insulating member, while the other end of the enclosure is detachably connected to the motor-side insulating member.

In a preferred embodiment, the enclosure is made of an insulating elastic material. In a preferred embodiment, the enclosure has a labyrinth structure comprising at least a first enclosure portion extending from the cable-side insulating member toward the motor-side insulating member, and a second enclosure portion extending from the motor-side insulating member toward the cable-side insulating member.

Advantages of the Invention

The enclosed space is filled with the insulating resin, and the connecting portion of the cable contact and the motor contact is covered with the resin. Thus, the resin can ensure an adequate insulation distance for the connecting portion of the cable contact and the motor contact, and can therefore prevent an electrical leakage accident.

The enclosure surrounds those exposed portions of the cable contact and the motor contact which are located in the enclosed space. Thus, the enclosure can ensure an adequate insulation distance for the exposed portions, and can therefore prevent an electrical leakage accident.

DESCRIPTION OF EMBODIMENTS

Embodiments of the present invention will now be described with reference to the drawings. In the below-described drawings, the same symbols are used to refer to the same or equivalent components or elements, and a duplicate description thereof is omitted.

The following description illustrates a submersible dry motor as an example of a submersible machine; however, a submersible machine is not limited to a submersible dry motor. A submersible dry generator is another example of a submersible machine.

Figure 1:
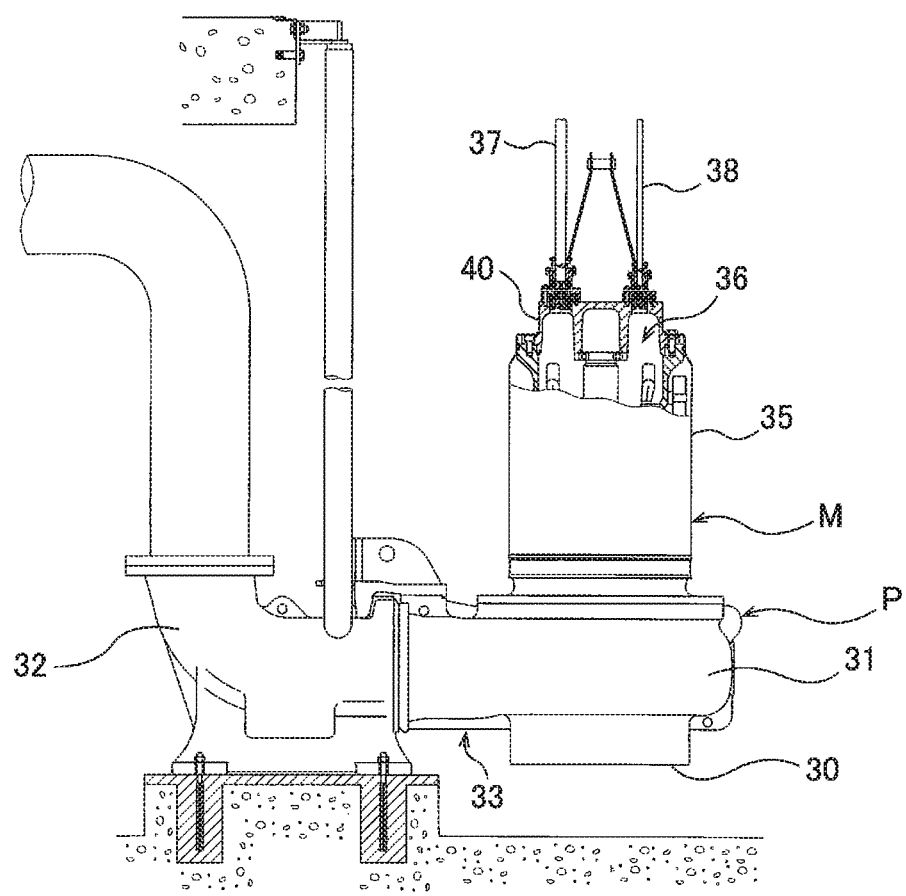
FIG. 1 is a diagram showing a submersible volute pump apparatus including a submersible motor according to an embodiment of the present invention.
Figure 2:
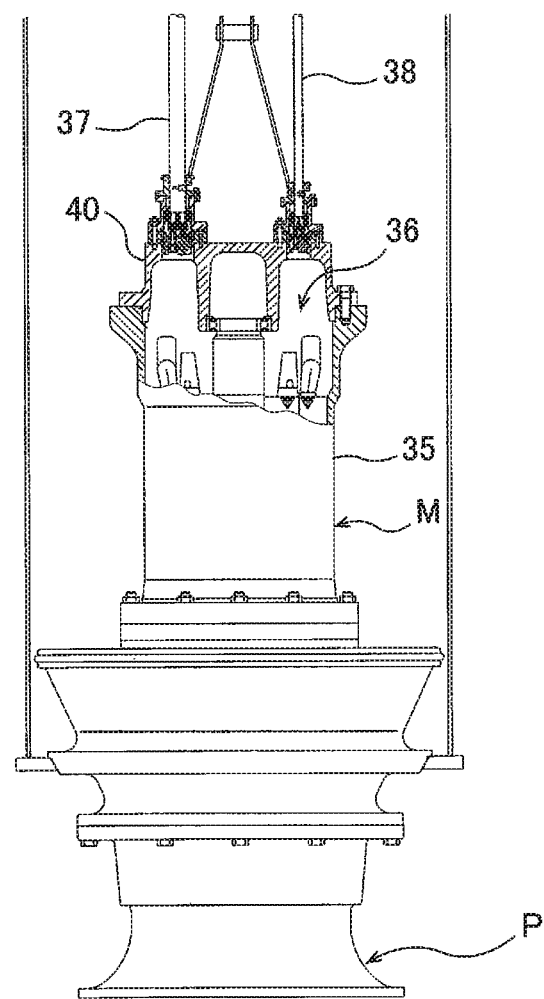
FIG. 2 is a diagram showing a submersible mixed flow pump apparatus including a submersible motor according to an embodiment of the present invention.

FIG. 1 is a diagram showing a submersible volute pump apparatus including a submersible motor according to an embodiment of the present invention. FIG. 2 is a diagram showing a submersible mixed flow pump apparatus including the submersible motor according to the embodiment of the present invention. As shown in FIGS. 1 and 2, the submersible motor can be applied to a submersible pump such as a submersible volute pump or a submersible mixed flow pump. A submersible volute pump apparatus including the submersible motor will now be described with reference to FIG. 1.

As shown in FIG. 1, the pump apparatus includes a submersible motor M and a pump P. The submersible motor M is connected to the pump P. An impeller (not shown) is provided in a pump casing 33 having a suction opening 30, a volute chamber 31 and a discharge pipe 32. When the impeller rotates, water is sucked from the suction opening 30 and transferred through the discharge pipe 32. A cylindrical motor casing 35, which liquid-tightly surrounds a motor body 36, is connected to the pump casing 33. A cable 37 and a control cable 38 are electrically connectable to the motor body 36.

Figure 3:
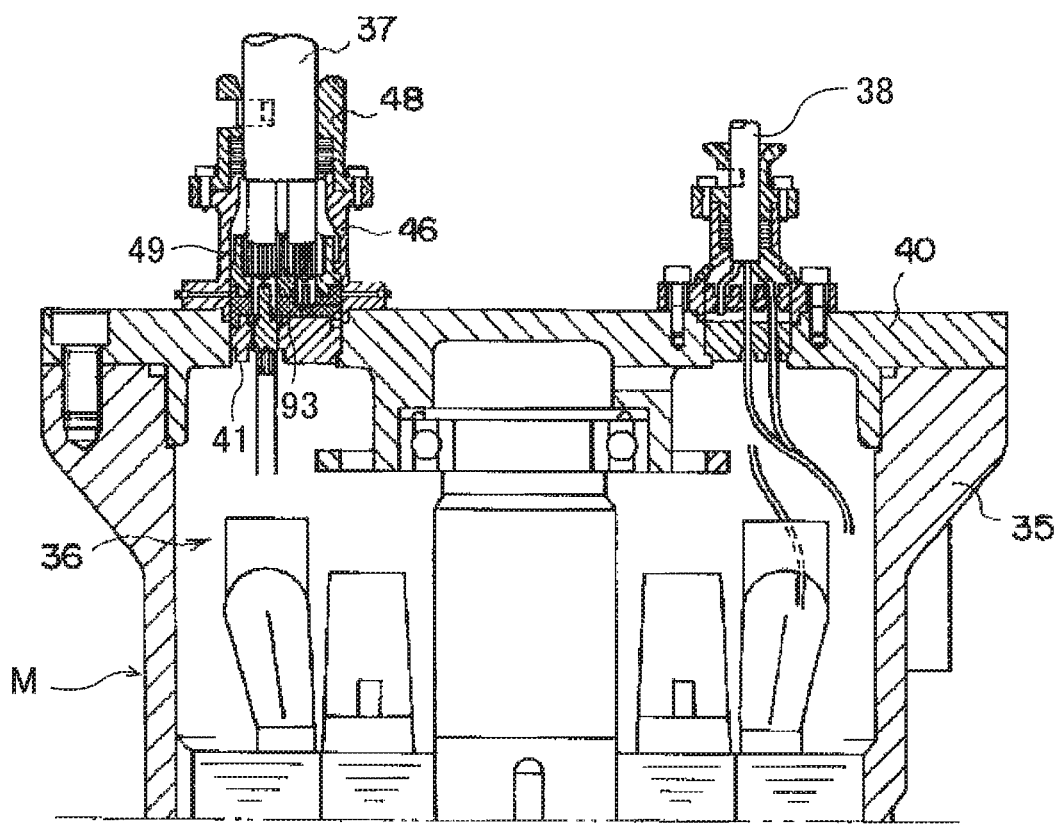
FIG. 3 is a cross-sectional view illustrating connection between a motor body and cables.
Figure 4:
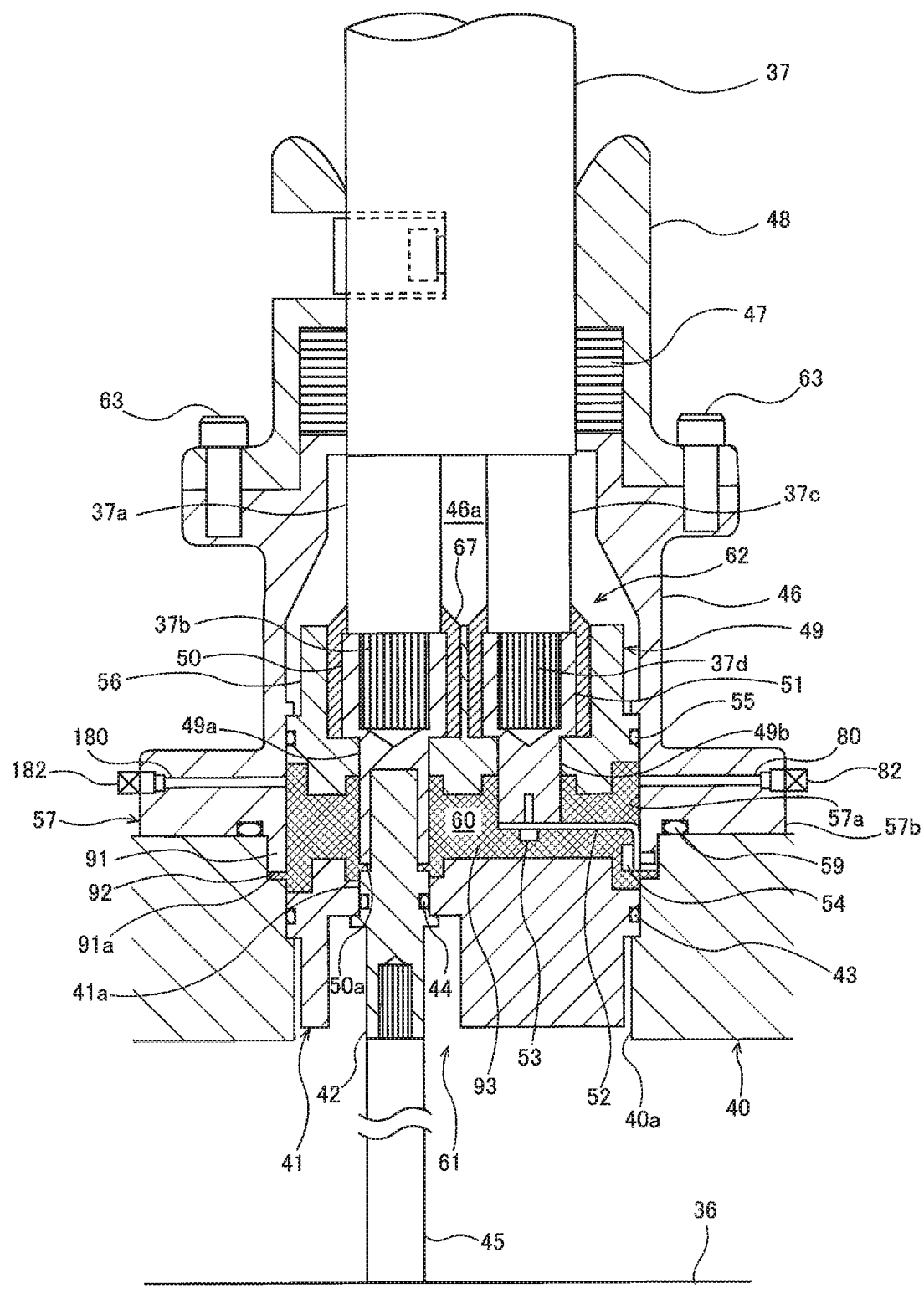
FIG. 4 is a diagram showing an embodiment of a waterproof connector.

FIG. 3 is a cross-sectional view illustrating connection between the motor body 36 and the cables 37, 38. FIG. 4 is a diagram showing an embodiment of a waterproof connector. The shape of the submersible motor M shown in FIG. 3 slightly differs from the shape of the submersible motor M shown in FIGS. 1 and 2. The motor casing 35 has, at its end, a top plate 40. A motor-side insulator (motor-side insulating member) 41 is liquid-tightly coupled to an opening 40a of the top plate 40. The motor-side insulator 41 has a motor-side hole 41a.

A motor contact 42 is liquid-tightly mounted in the motor-side hole 41a. An O-ring (sealing member) 43 is disposed between the top plate 40 and the motor-side insulator 41, and an O-ring (sealing member) 44 is disposed between the motor-side insulator 41 and the motor contact 42. A lead wire 45, which is connected to the motor body 36, is electrically connected to the motor contact 42.

The front end of the cable 37 is surrounded by a cylindrical connector body 46. A cable gland 48 is fixed to the connector body 46 via a cable packing (sealing member) 47 by fastening screws 63. The connector body 46 and the cable gland 48 are collectively referred to herein as a conductive cover member. The cable packing 47 has an annular shape, and is disposed between the cable 37 (more specifically a cable cover that covers the cable 37) and the cable gland 48.

A cable-side insulator (cable-side insulating member) 49 is liquid-tightly coupled to the connector body 46. The cable-side insulator 49 has a first cable-side hole 49a and a second cable-side hole 49b. A cable contact 50 is liquid-tightly mounted in the first cable-side hole 49a, and an earth contact 51 is liquid-tightly mounted in the second cable-side hole 49b.

The cable contact 50 is provided such that its front end 50a projects outward from the exterior surface of the cable-side insulator 49. The exterior surface of the cable-side insulator 49 is a surface that faces the motor-side insulator 41. A power cable 37a of the cable 37 is electrically connected to the cable contact 50. The power cable 37a is a cable to supply power to the motor body 36. An earth cable 37c of the cable 37 is electrically connected to the earth contact 51.

A waterproof connector is composed of a motor-side connector 61 and a cable-side connector 62. The motor-side connector 61 is basically composed of the motor-side insulator 41 and the motor contact 42, while the cable-side connector 62 is basically composed of the conductive cover member (the connector body 46 and the cable gland 48), the cable-side insulator 49, the cable contact 50 and the earth contact 51.

An O-ring (sealing member) 55 is disposed between the connector body 46 and the cable-side insulator 49, and an O-ring (sealing member) 59 is disposed between the connector body 46 and the top plate 40. The O-ring 55 ensures the liquid-tightness between the connector body 46 and the cable-side insulator 49, and the O-ring 59 ensures the liquid-tightness between the connector body 46 and the top plate 40.

A wall 56 is connected to the interior surface of the cable-side insulator 49. The wall 56 extends along a direction in which the cable contact 50 extends. The cable-side insulator 49 and the wall 56 are constructed integrally. The interior surface of the cable-side insulator 49 is a surface opposite to the exterior surface of the cable-side insulator 49.

A space between the wall 56 and the cable contact 50 is filled with a resin 67 such that it covers the contacts 50, 51 and the exposed portions 37b, 37d of the cables 37a, 37c. The resin 67 can air-tightly and liquid-tightly isolate the exposed portions 37b, 37d of the cables 37a, 37c from a space 46a. The contacts 50, 51 are liquid-tightly mounted to the cable-side insulator 49 via the resin 67. The processing of covering the exposed portions 37b, 37d of the cables 37a, 37c with the resin 67 is termed waterproofing. According to this embodiment, the resin 67 can prevent land-side water from entering the connector connecting portion and the submersible motor M via the cable 37.

The connector body 46 has a flange portion 57 projecting from the lower end of the connector body 46. The connector body 46 and the flange portion 57 are constructed integrally. The flange portion 57 is liquid-tightly secured to the top plate 40 of the motor casing 35 by means of not-shown fastening tools (e.g. screws). The flange portion 57 has fastening holes (not shown) for insertion of the fastening tools. The fastening holes are arranged in the circumferential direction of the flange portion 57. The flange portion 57 is liquid-tightly secured to the top plate 40 by inserting the fastening tools into the fastening holes, and tightening the fastening tools.

The flange portion 57 has a cylindrical raised portion 91 projecting from the lower end of the flange portion 57, while the top plate 40 has a cylindrical recessed portion 92 formed in the opening 40a of the top plate 40. The cylindrical raised portion 91 forms part of an opening of the conductive cover member, while the cylindrical recessed portion 92 forms part of the opening 40a of the top plate 40. The cylindrical raised portion 91 and the cylindrical recessed portion 92 are configured to engage each other.

The cable contact 50 projects outward in a direction from the cable-side insulator 49 toward the motor-side insulator 41. The front end 91a of the cylindrical raised portion 91 projects toward the motor-side insulator 41 further outward than the front end 50a of the cable contact 50. The positional relationship between the cable contact 50 and the cable-side insulator 49 and the positional relationship between the cylindrical raised portion 91 and the cable contact 50 make it possible to use molded products of a resin or the like as the motor-side insulator 41 and the cable-side insulator 49. In particular, the positional relationships ensure a connecting portion space (enclosed space) 60 between the exterior surface of the motor-side insulator 41 and the exterior surface of the cable-side insulator 49. Even when molded products of a resin or the like, which are poor in the accuracy of finished dimension as compared to mechanically-processed products, are used as the motor-side insulator 41 and the cable-side insulator 49, the connecting portion space 60 can absorb variation in the dimensions of the insulators 41, 49 due to production errors, assembling errors, etc., and can securely effect electrical/mechanical connection between the motor contact 42 and the cable contact 50 and mechanical connection between the cylindrical raised portion 91 and the cylindrical recessed portion 92.

Further, the engagement between the cylindrical walls (the cylindrical raised portion 91 and the cylindrical recessed portion 92) according to this embodiment can facilitate attachment/detachment of the waterproof connector and can easily form a secure sealing structure.

The waterproof connector includes a plate-like earthing member 52 for electrically connecting the earth contact 51 and the conductive cover member. The earthing member 52 is L-shaped, and made of a conductive material. The earthing member 52 is fixed to the earth contact 51 with a screw 53, and fixed to the connector body 46 (more specifically the cylindrical raised portion 91) with a screw 54.

The waterproof connector also includes an insulating resin 93 that fills the connecting portion space 60 formed between the cable-side insulator 49 and the motor-side insulator 41 (see the hatching of FIG. 4). The connecting portion space 60 is an enclosed space formed by the motor-side insulator 41, the cable-side insulator 49, the top plate 40 and the connector body 46, and the resin 93 has been filled into the connecting portion space 60 through a resin injection hole 80 formed in the connector body 46. In this embodiment, the entire connecting portion space 60 is completely filled with the resin 93.

The resin 93 is in contact with the motor-side insulator 41, the cable-side insulator 49, the top plate 40 and the connector body 46; the members 41, 49, 40, 46 are connected via the resin 93. The connecting portion of the cable contact 50 and the motor contact 42 is located in the connecting portion space 60 and covered with the resin 93. The earthing member 52 is also covered with the resin 93. In this embodiment, the exposed portions of the cable contact 50 and the motor contact 42 are entirely covered with the resin 93.

As described above, the resin injection hole 80, communicating with the connector body 46, is formed in the flange portion 57 of the connector body 46. The resin injection hole 80 extends from the interior surface 57a of the flange portion 57 to the exterior surface 57b of the flange portion 57. The resin injection hole 80 opens to the interior surface 57a of the flange portion 57 at a position between the cable-side insulator 49 and the motor-side insulator 41. In this embodiment, the resin injection hole 80 opens at an upper position in the connecting portion space 60.

The flange portion 57 extends outward in the radial direction of the connector body 46, and the resin injection hole 80 extends along a direction in which the flange portion 57 extends. In this embodiment, the resin injection hole 80 extends linearly in a direction away from the connecting portion space 60 and penetrates the connector body 46. In one embodiment, the resin injection hole 80 may be bent (or curved).

A plug 82 is mounted to the resin injection hole 80; the resin injection hole 80 is plugged with the plug 82. The plug 82 thus prevents passage of water through the resin injection hole 80. When the plug 82 is detached, the connecting portion space 60 communicates with the external space through the resin injection hole 80. The resin 93 is a resin having fluidity and insulating properties, and has the property of hardening with time. A dissolvable resin 4441J, manufactured by 3M Company, is an example of the resin 93. The connecting portion space 60 becomes filled with the resin 93 when it is injected into the connecting portion space 60 through the resin injection hole 80.

An air vent hole 180, which communicates with the connecting portion space 60, is formed in the flange portion 57 of the connector body 46. A plug member 182 is mounted to the air vent hole 180. The air vent hole 180 is plugged with the plug member 182. When the resin 93 is introduced into the connecting portion space 60 through the resin injection hole 80 after detaching the plug 82 and the plug member 182, air is forced out of the connecting portion space 60 through the air vent hole 180. After the resin 93 is filled into the connecting portion space 60, the resin injection hole 80 and the air vent hole 180 are plugged with the plug 82 and the plug member 182, respectively.

In this embodiment, the air vent hole 180 opens at an upper position in the connecting portion space 60. The air vent hole 180 is disposed on the opposite side of the connecting portion space 60 from the resin injection hole 80. However, the positional relationship between the resin injection hole 80 and the air vent hole 180 is not limited to that of this embodiment, and may be determined arbitrarily.

According to this embodiment, upon the filling of the resin 93, air in the connecting portion space 60 is discharged through the air vent hole 180, and the connecting portion space 60 becomes filled with the resin 93 without any air remaining in the connecting portion space 60. The connecting portion of the cable contact 50 and the motor contact 42 is covered with the resin 93. The resin 93 having insulating properties can ensure an adequate insulation distance for the connecting portion of the contacts 50, 42, and can therefore prevent an electrical leakage accident. Further, the use of the connector-type submersible motor according to this embodiment can facilitate such an insulating treatment.

Further, according to this embodiment, the connecting portion space 60 is completely filled with the resin 93. Thus, no air is present in the connecting portion space 60 filled with the resin 93. This can prevent the occurrence of dew condensation in the connecting portion space 60. Further, according to this embodiment, the resin 93 after curing has elasticity; therefore, the resin 93 that fills the connecting portion space 60 can absorb vibration caused by the operation of the submersible motor M. This can prevent damage to a member constituting the waterproof connector. The resin 93 can thus contribute to dealing with vibration of the submersible motor M. Further, according to this embodiment, the resin 93 functions also as a sealing member, thus making it possible to more securely prevent water from entering the connecting portion space 60.

A process for connecting the above-described waterproof connector will now be described. First, the motor contact 42, to which the lead wire 45 is connected, is liquid-tightly mounted to the motor-side hole 41a of the motor-side insulator 41. The cable contact 50, to which the power cable 37a is connected, is liquid-tightly mounted to the cable-side hole 49a of the cable-side insulator 49, and the earth contact 51, to which the earth cable 37c is connected, is liquid-tightly mounted to the cable-side hole 49b. After connecting the cables 37a, 37c to the contacts 50, 51, respectively, the resin 67 is injected into the spaces between the wall 56 and the contacts 50, 51, and the resin 67 is cured.

Next, the contacts 42, 50 are connected to each other, and the power cable 37a is electrically connected to the lead wire 45. Though not shown diagrammatically, the control cable 38 is connected in the same manner. After connecting the contacts 42, 50 to each other, the resin 93 is injected into the connecting portion space 60 through the resin injection hole 80, and the resin 93 is cured.

Despite the use of the connector structure, the thus-constructed submersible motor M can sufficiently keep liquid-tightness. In particular, the engagement between the cylindrical walls (the cylindrical raised portion 91 and the cylindrical recessed portion 92), the O-rings 43, 44, 55, 59 and the cable packing 47 can easily form a secure sealing structure. Further, the filling of the connecting portion space 60 with the resin 93 can form a more secure sealing structure. The O-rings 43, 44 (and the resin 93) prevent entry of water into the motor body 36. Thus, should the waterproof connector be detached in water, there is no fear of entry of water into the motor body 36.

Figure 5:
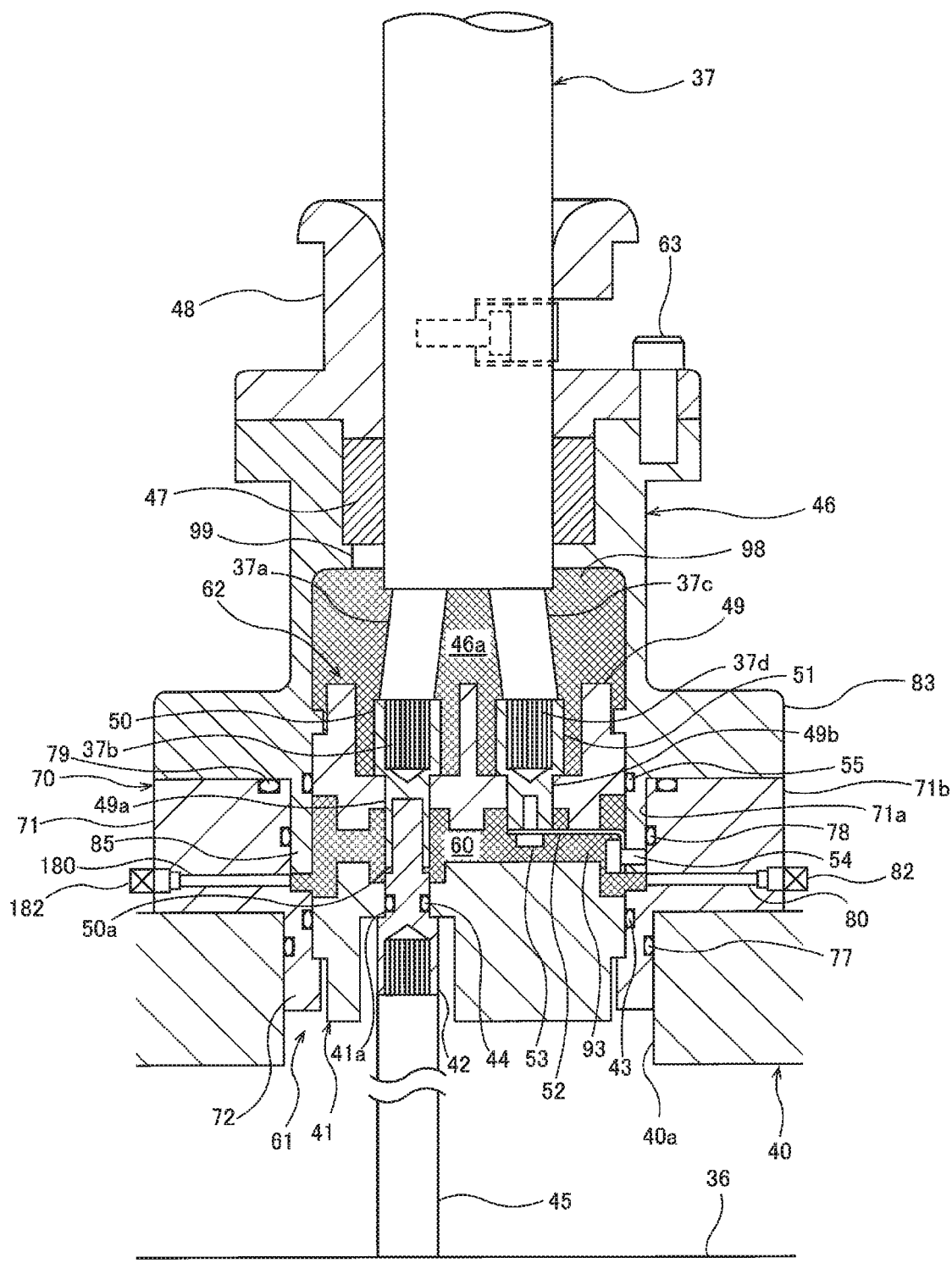
FIG. 5 is a cross-sectional view showing another embodiment of a waterproof connector.

FIG. 5 is a cross-sectional view showing another embodiment of a waterproof connector. The construction and the operation of this embodiment, not particularly described here, are the same as those of the above-described embodiment, and a duplicate description thereof is omitted. The waterproof connector further includes a socket member (intermediate member) 70 disposed between the connector body 46 and the top plate 40. In this embodiment, the connector body 46, the cable gland 48 and the socket member 70 are collectively referred to as a conductive cover member. The connector body 46 is liquid-tightly coupled to the top plate 40 of the motor casing 35 via the socket member 70.

The shape of the socket member 70 can be determined relatively freely, and the socket member 70 can be processed relatively easily. According to this embodiment, the connector body 46 can be connected to the motor casing 35 (more specifically the top plate 40) merely by processing the socket member 70 without directly processing the motor casing 35.

The socket member 70 is liquid-tightly coupled to the opening 40a of the top plate 40, and the motor-side insulator 41 is liquid-tightly coupled to the socket member 70. An O-ring (sealing member) 77 is disposed between the socket member 70 and the top plate 40, and an O-ring (sealing member) 43 is disposed between the socket member 70 and the motor-side insulator 41. The O-ring 77 ensures the liquid-tightness between the socket member 70 and the top plate 40, and the O-ring 43 ensures the liquid-tightness between the socket member 70 and the motor-side insulator 41.

The connector body 46 has a flange portion 83 projecting from the lower end of the connector body 46. The flange portion 83 corresponds to the flange portion 57 of the above-described embodiment. The flange portion 83 has a cylindrical portion 85 projecting from the lower end of the flange portion 83. The cylindrical portion 85 is configured to engage the socket member 70. The front end of the cylindrical portion 85 projects toward the motor-side insulator 41 further outward than the front end 50a of the cable contact 50. The cylindrical portion 85 corresponds to the cylindrical raised portion 91 of the above-described embodiment.

The socket member 70 is composed of a flange portion 71 and a cylindrical portion 72 projecting from the lower surface of the flange portion 71. The flange portion 71 and the cylindrical portion 72 are constructed integrally. The flange portion 71 has a receiving hole (interior surface) 71a formed in the center of the flange portion 71. The cylindrical portion 85 and the receiving hole 71a are configured to engage each other.

The flange portions 71, 83 each have fastening holes (not shown) for insertion of fastening tools (not shown). The fastening holes are arranged in the circumferential direction of the flange portions 71, 83.

The connector body 46 is coupled to the socket member 70 such that the fastening holes of the connector body 46 are connected to the fastening holes of the socket member 70. Thereafter, the fastening tools are inserted into the fastening holes, and the fastening tools are tightened, whereby the connector body 46 is coupled to the top plate 40 via the socket member 70.

An O-ring (sealing member) 78 is disposed between the cylindrical portion 85 of the connector body 46 and the receiving hole 71a of the flange portion 71 (i.e. the interior surface of the flange portion 71), and an O-ring (sealing member) 79 is disposed between the exterior surface 71b of the flange portion 71 and the flange portion 83 of the connector body 46.

The O-rings 78, 79 ensure the liquid-tightness between the connector body 46 and the socket member 70.

When mounting the connector body 46 to the socket member 70, the cylindrical portion 85 comes into contact with the flange portion 71 before the contacts 42, 50 come into contact with each other: the front end of the cylindrical portion 85 projects toward the motor-side insulator 41 further outward than the front end 50a of the cable contact 50, and the exterior surface 71b of the flange portion 71 extends toward the cable-side insulator 49 further outward than the front end of the motor contact 42. Accordingly, the cylindrical portion 85 can contact the flange portion 71 before the cable contact 50 comes into contact with the motor contact 42. When detaching the waterproof connector, the cylindrical portion 85 leaves the flange portion 71 after the cable contact 50 leaves the motor contact 42. Thus, upon connection of the waterproof connector, the earth connection is made prior to connection of the contacts 50, 42, while upon detachment of the waterproof connector, the earth connection is disconnected after separation between the contacts 50, 42. This can prevent the occurrence of an operator's electrical shock accident.

In this embodiment, the space 46a in the connector body 46 is filled with an insulating resin 98, and the cables 37a, 37c and their exposed portions 37b, 37d are completely covered with the resin 98. A groove 99 for pouring the resin 98 into the space 46a is formed in the interior surface of the connector body 46. The provision of the groove 99 makes it possible fill the resin 98 into the space 46a with the cable 37 set in the waterproof connector.

As shown in FIG. 5, the resin injection hole 80 is formed in the socket member 70 and penetrates the socket member 70. More specifically, the resin injection hole 80 extends from the receiving hole (i.e. the interior surface) 71a of the flange portion 71 to the exterior surface 71b of the flange portion 71. The resin injection hole 80 opens to the interior surface 71a of the flange portion 71 at a position between the cylindrical portion 85 and the cylindrical portion 72. In this embodiment, the resin injection hole 80 opens at a lower position in the connecting portion space 60.

The air vent hole 180 is formed in the socket member 70 and opens at a lower position in the connecting portion space 60. The air vent hole 180 is disposed on the opposite side of the connecting portion space 60 from the resin injection hole 80. However, the positional relationship between the resin injection hole 80 and the air vent hole 180 is not limited to that of this embodiment, and may be determined arbitrarily.

Figure 6:
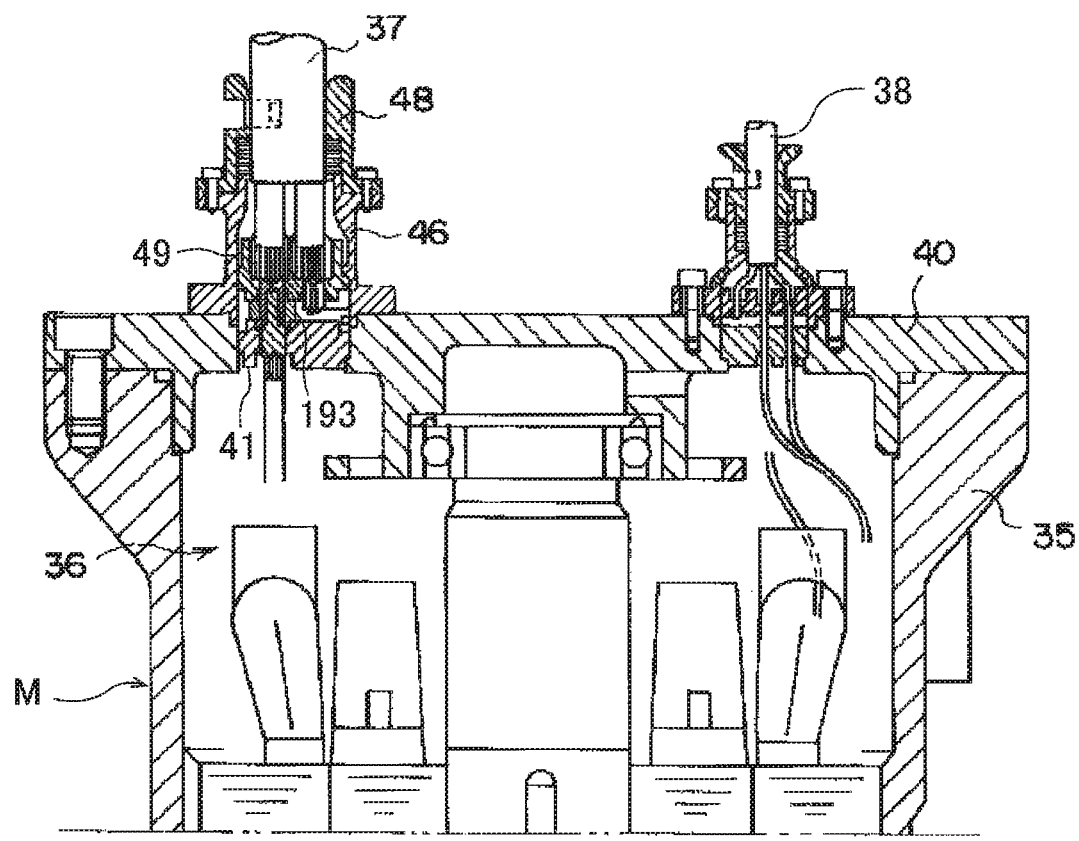
FIG. 6 is a cross-sectional view illustrating connection between a motor body and cables.
Figure 7:
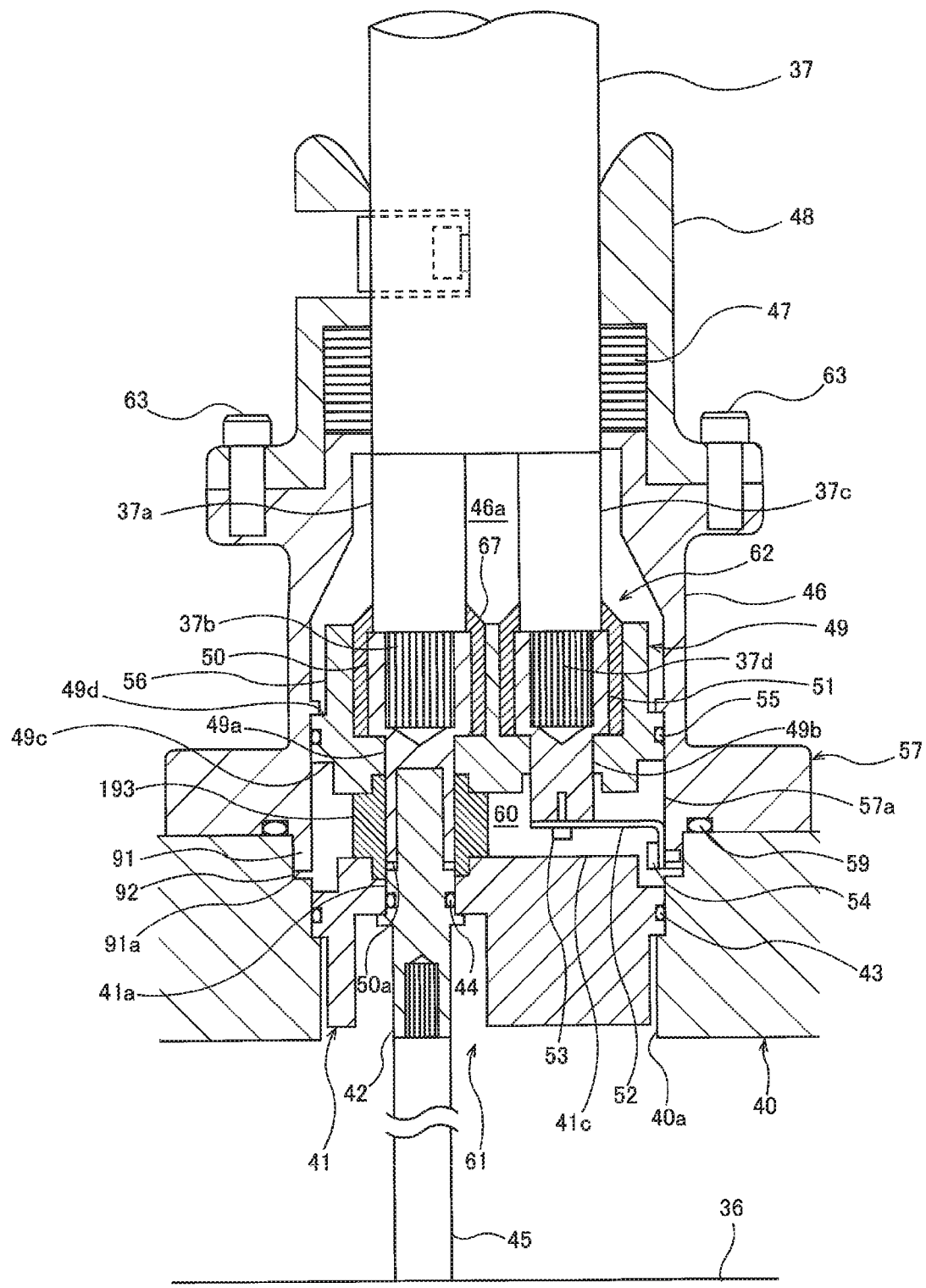
FIG. 7 is a diagram showing yet another embodiment of a waterproof connector.

FIG. 6 is a cross-sectional view illustrating connection between the motor body 36 and the cables 37, 38. FIG. 7 is a diagram showing yet another embodiment of a waterproof connector. The motor casing 35 has, at its end, a top plate 40. A motor-side insulator (motor-side insulating member) 41 is liquid-tightly coupled to an opening 40a of the top plate 40. The motor-side insulator 41 has a motor-side hole 41a.

A motor contact 42 is liquid-tightly mounted in the motor-side hole 41a. An O-ring (sealing member) 43 is disposed between the top plate 40 and the motor-side insulator 41, and an O-ring (sealing member) 44 is disposed between the motor-side insulator 41 and the motor contact 42. A lead wire 45, which is connected to the motor body 36, is electrically connected to the motor contact 42.

The front end of the cable 37 is surrounded by a cylindrical connector body 46. A cable gland 48 is fixed to the connector body 46 via a cable packing (sealing member) 47 by fastening screws 63. The connector body 46 and the cable gland 48 are collectively referred to herein as a conductive cover member. The cable packing 47 has an annular shape, and is disposed between the cable 37 (more specifically a cable cover that covers the cable 37) and the cable gland 48.

A cable-side insulator (cable-side insulating member) 49 is liquid-tightly coupled to the connector body 46. The cable-side insulator 49 has a first cable-side hole 49a and a second cable-side hole 49b. A cable contact 50 is liquid-tightly mounted in the first cable-side hole 49a, and an earth contact 51 is liquid-tightly mounted in the second cable-side hole 49b.

The cable contact 50 is provided such that its front end 50a projects outward from the exterior surface 49c of the cable-side insulator 49. The exterior surface 49c of the cable-side insulator 49 is a surface that faces the motor-side insulator 41. A power cable 37a of the cable 37 is electrically connected to the cable contact 50. The power cable 37a is a cable to supply power to the motor body 36. An earth cable 37c of the cable 37 is electrically connected to the earth contact 51.

A waterproof connector is composed of a motor-side connector 61 and a cable-side connector 62. The motor-side connector 61 is basically composed of the motor-side insulator 41 and the motor contact 42, while the cable-side connector 62 is basically composed of the conductive cover member (the connector body 46 and the cable gland 48), the cable-side insulator 49, the cable contact 50 and the earth contact 51.

An O-ring (sealing member) 55 is disposed between the connector body 46 and the cable-side insulator 49, and an O-ring (sealing member) 59 is disposed between the connector body 46 and the top plate 40. The O-ring 55 ensures the liquid-tightness between the connector body 46 and the cable-side insulator 49, and the O-ring 59 ensures the liquid-tightness between the connector body 46 and the top plate 40.

A wall 56 is connected to the interior surface 49d of the cable-side insulator 49. The wall 56 extends along a direction in which the cable contact 50 extends. The cable-side insulator 49 and the wall 56 are constructed integrally. The interior surface 49d of the cable-side insulator 49 is a surface opposite to the exterior surface 49c of the cable-side insulator 49.

A space between the wall 56 and the cable contact 50 is filled with a resin 67 such that it covers the contacts 50, 51 and the exposed portions 37b, 37d of the cables 37a, 37c.

The resin 67 can air-tightly and liquid-tightly isolate the exposed portions 37b, 37d of the cables 37a, 37c from a space 46a. The contacts 50, 51 are liquid-tightly mounted to the cable-side insulator 49 via the resin 67. The processing of covering the exposed portions 37b, 37d of the cables 37a, 37c with the resin 67 is termed waterproofing. According to this embodiment, the resin 67 can prevent land-side water from entering the connector connecting portion and the submersible motor M via the cable 37.

The connector body 46 has a flange portion 57 projecting from the lower end of the connector body 46. The connector body 46 and the flange portion 57 are constructed integrally. The flange portion 57 is liquid-tightly secured to the top plate 40 of the motor casing 35 by means of not-shown fastening tools (e.g. screws). The flange portion 57 has fastening holes (not shown) for insertion of the fastening tools. The fastening holes are arranged in the circumferential direction of the flange portion 57. The flange portion 57 is liquid-tightly secured to the top plate 40 by inserting the fastening tools into the fastening holes, and tightening the fastening tools.

The flange portion 57 has a cylindrical raised portion 91 projecting from the lower end of the flange portion 57, while the top plate 40 has a cylindrical recessed portion 92 formed in the opening 40a of the top plate 40. The cylindrical raised portion 91 forms part of an opening of the conductive cover member, while the cylindrical recessed portion 92 forms part of the opening 40a of the top plate 40. The cylindrical raised portion 91 and the cylindrical recessed portion 92 are configured to engage each other.

The cable contact 50 projects outward in a direction from the cable-side insulator 49 toward the motor-side insulator 41. The front end 91a of the cylindrical raised portion 91 projects toward the motor-side insulator 41 further outward than the front end 50a of the cable contact 50. The positional relationship between the cable contact 50 and the cable-side insulator 49 and the positional relationship between the cylindrical raised portion 91 and the cable contact 50 make it possible to use molded products of a resin or the like as the motor-side insulator 41 and the cable-side insulator 49. In particular, the positional relationships ensure a connecting portion space (enclosed space) 60 between the exterior surface 41c of the motor-side insulator 41 and the exterior surface 49c of the cable-side insulator 49. Even when molded products of a resin or the like, which are poor in the accuracy of finished dimension as compared to mechanically-processed products, are used as the motor-side insulator 41 and the cable-side insulator 49, the connecting portion space 60 can absorb variation in the dimensions of the insulators 41, 49 due to production errors, assembling errors, etc., and can securely effect electrical/mechanical connection between the motor contact 42 and the cable contact 50 and mechanical connection between the cylindrical raised portion 91 and the cylindrical recessed portion 92.

Further, the engagement between the cylindrical walls (the cylindrical raised portion 91 and the cylindrical recessed portion 92) according to this embodiment can facilitate attachment/detachment of the waterproof connector and can easily form a secure sealing structure.

The waterproof connector includes a plate-like earthing member 52 for electrically connecting the earth contact 51 and the conductive cover member. The earthing member 52 is L-shaped, and made of a conductive material. The earthing member 52 is fixed to the earth contact 51 with a screw 53, and fixed to the connector body 46 (more specifically the cylindrical raised portion 91) with a screw 54.

The waterproof connector also includes an insulating enclosure 193 disposed in the connecting portion space 60 formed between the cable-side insulator 49 and the motor-side insulator 41. The connecting portion space 60 is an enclosed space formed by the motor-side insulator 41, the cable-side insulator 49, the top plate 40 and the connector body 46. The enclosure 193 surrounds the exposed portions of the cable contact 50 and the motor contact 42, located in the connecting portion space 60.

Figure 8:
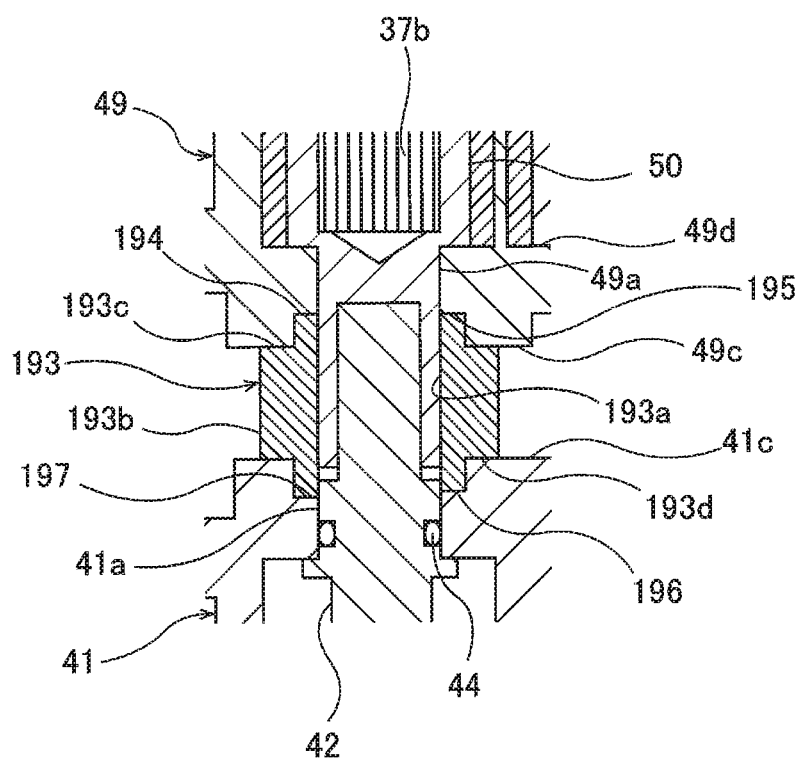
FIG. 8 is an enlarged cross-sectional view of an enclosure.

FIG. 8 is an enlarged cross-sectional view of the enclosure 193. The enclosure 193 has a cylindrical shape, and is made of an insulating elastic material (e.g. rubber). The interior surface 193a of the enclosure 193 is located adjacent to the exposed portions of the cable contact 50 and the motor contact 42. In this embodiment, the interior surface 193a of the enclosure 193 is in contact with a large part of the exposed portions of the cable contact 50 and the motor contact 42. The interior surface 193a of the enclosure 193 need not necessarily be in contact with the entire exposed portions of the contacts 50, 42, and may be away from the exposed portions. The exterior surface 193b of the enclosure 193 is not in contact with, but away from the interior surface 57a (see FIG. 7) of the flange portion 57.

One end 193c of the enclosure 193 is detachably connected to the cable-side insulator 49, while the other end 193d of the enclosure 193 is detachably connected to the motor-side insulator 41. An annular projecting portion (first projecting portion) 194, extending toward the cable-side insulator 49, is formed in the one end 193c of the enclosure 193. An annular recessed portion 195, which engages the projecting portion 194, is formed in the cable-side insulator 49. The recessed portion 195 is formed in the exterior surface 49c of the cable-side insulator 49 and connects with the first cable-side hole 49a. When the projecting portion 194 is fitted into the recessed portion 195, the enclosure 193 is connected to the cable-side insulator 49.

An annular projecting portion (second projecting portion) 196, extending toward the motor-side insulator 41, is formed in the other one end 193d of the enclosure 193. An annular recessed portion 197, which engages the projecting portion 196, is formed in the motor-side insulator 41. The recessed portion 197 is formed in the exterior surface 41c of the motor-side insulator 41 and connects with the motor-side hole 41a. When the projecting portion 196 is fitted into the recessed portion 197, the enclosure 193 is connected to the motor-side insulator 41. In this embodiment, the diameter of the recessed portion 195 is equal to the diameter of the recessed portion 197, and the front end 50a of the cable contact 50 is located in the recessed portion 197.

In one embodiment, instead of providing the recessed portions 195, 197 in the insulators 49, 41, respectively, an annular projection may be provided in each of the insulators 41, 49. In particular, an annular projection, extending toward the motor-side insulator 41, may be provided in the cable-side insulator 49, while an annular projection, extending toward the cable-side insulator 49, may be provided in the motor-side insulator 41. In that case, one end 193c of the enclosure 193 is detachably connected to the projection of the cable-side insulator 49, while the other end 193d of the enclosure 193 is detachably connected to the projection of the motor-side insulator 41.

According to this embodiment, the insulating enclosure 193 surrounds the exposed portions of the cable contact 50 and the motor contact 42, located in the connecting portion space 60. Thus, the enclosure 193 can ensure an adequate insulation distance for the exposed portions, and can therefore prevent an electrical leakage accident.

In this embodiment, the enclosure 193 is comprised of a member different from the cable-side insulator 49 and the motor-side insulator 41. In other words, the enclosure 193 and the insulators 49, 41 are separate members. Thus, an electrical leakage accident can be securely prevented by simply adding the enclosure 193. Further, according to this embodiment, the enclosure 193 can be easily mounted to the insulators 41, 49, and can be easily detached from the insulators 41, 49. Therefore, maintenance such as replacement of the enclosure 193 can be performed easily.

Further, according to this embodiment, the enclosure 193 can function also as a sealing member; therefore, the use of the enclosure 193 can construct a double air-tight structure. In particular, the O-ring 59 ensures the liquid-tightness and air-tightness between the connector body 46 and the top plate 40, and the enclosure 193 ensures the liquid-tightness and air-tightness between the insulators 41, 49 and the enclosure 193.

Further, since the enclosure 193 according to this embodiment has elasticity, the enclosure 193 can absorb vibration caused by the operation of the submersible motor M. In the case of heavy vibration, the enclosure 193 can function as a damper, and therefore can prevent damage to a member constituting the waterproof connector. The enclosure 193 can thus contribute to dealing with vibration of the submersible motor M.

A process for connecting the above-described waterproof connector will now be described. First, the motor contact 42, to which the lead wire 45 is connected, is liquid-tightly mounted to the motor-side hole 41a of the motor-side insulator 41. The cable contact 50, to which the power cable 37a is connected, is liquid-tightly mounted to the cable-side hole 49a of the cable-side insulator 49, and the earth contact 51, to which the earth cable 37c is connected, is liquid-tightly mounted to the cable-side hole 49b. After connecting the cables 37a, 37c to the contacts 50, 51, respectively, the resin 67 is injected into the spaces between the wall 56 and the contacts 50, 51, and the resin 67 is cured.

Next, the enclosure 193 is connected to one of the motor-side insulator 41 and the cable-side insulator 49, and the contacts 42, 50 are connected to each other. As a result, the enclosure 193 is connected also to the other one of the insulators 41, 49, so that the enclosure 193 can cover the exposed portions of the cable contact 50 and the motor contact 42. By the connection of the contacts 42, 50, the power cable 37a is electrically connected to the lead wire 45. Though not shown diagrammatically, the control cable 38 is connected in the same manner.

Despite the use of the connector structure, the thus-constructed submersible motor M can sufficiently keep liquid-tightness. In particular, the engagement between the cylindrical walls (the cylindrical raised portion 91 and the cylindrical recessed portion 92), the O-rings 43, 44, 55, 59 and the cable packing 47 can easily form a secure sealing structure. Further, the use of the enclosure 193 which covers the exposed portions of the contacts 42, 50 can construct a more secure sealing structure. The O-rings 43, 44 prevent entry of water into the motor body 36. Thus, should the waterproof connector be detached in water, there is no fear of entry of water into the motor body 36.

Figure 9:
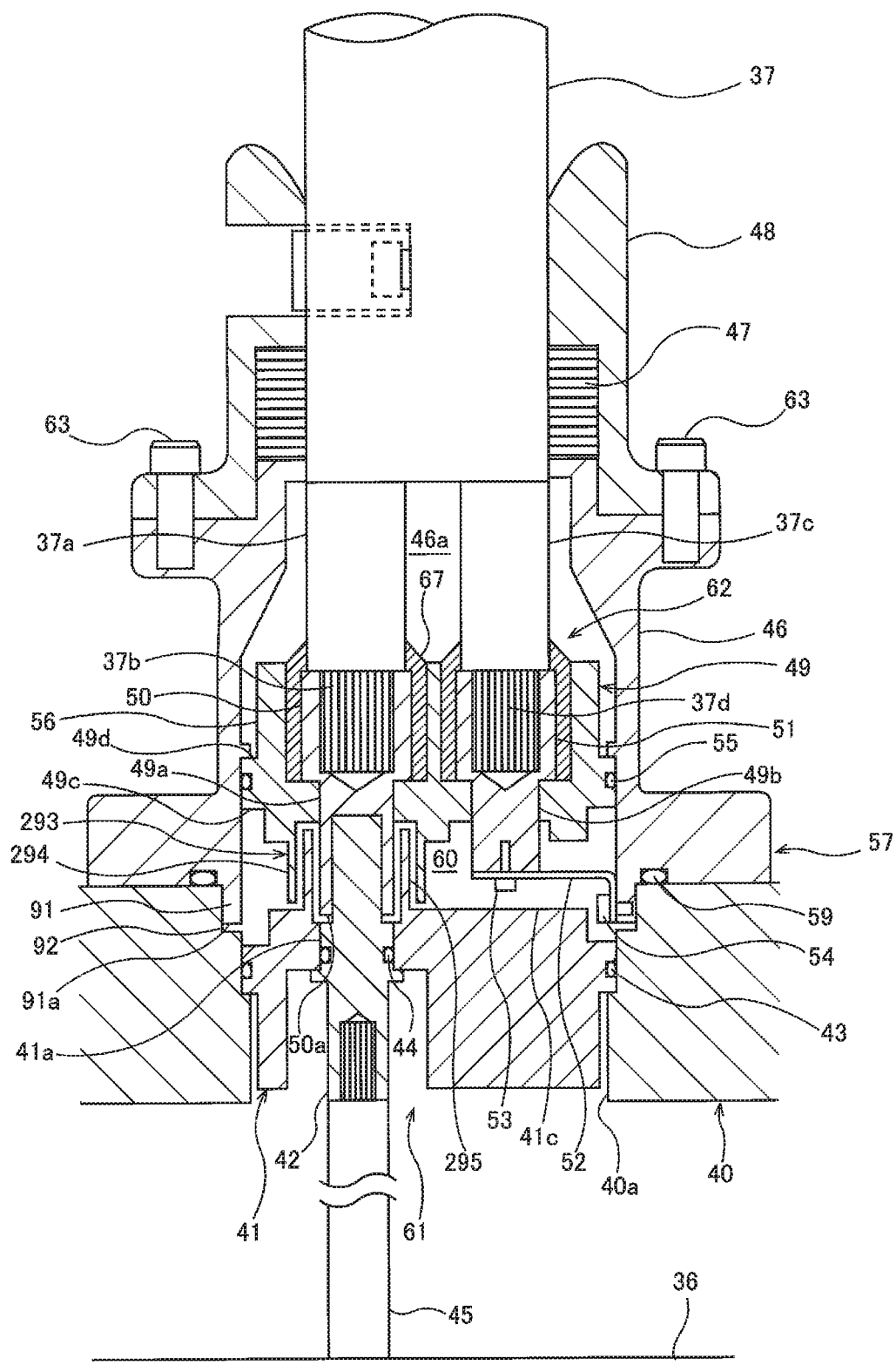
FIG. 9 is a cross-sectional view showing yet another embodiment of a waterproof connector.
Figure 10:
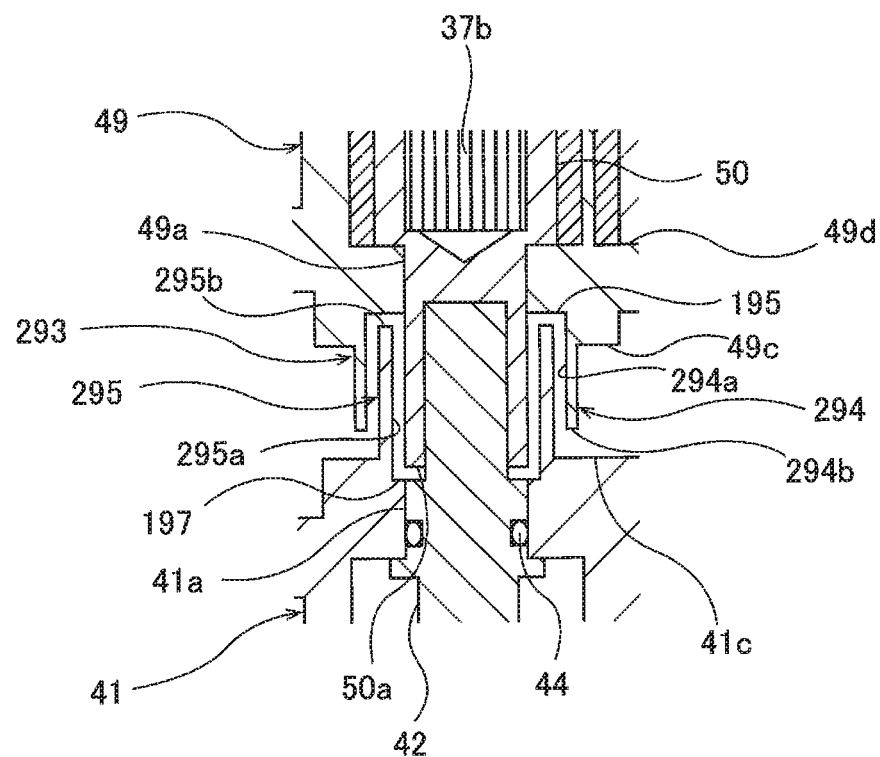
FIG. 10 is an enlarged cross-sectional view showing an embodiment of an enclosure.

FIG. 9 is a cross-sectional view showing yet another embodiment of a waterproof connector. FIG. 10 is an enlarged cross-sectional view showing an embodiment of an enclosure 293. The construction and the operation of this embodiment, not particularly described here, are the same as those of the above-described embodiment, and a duplicate description thereof is omitted. In this embodiment, the waterproof connector includes an insulating enclosure 293 disposed in the connecting portion space 60. The enclosure 293 has a labyrinth structure comprising at least a first enclosure portion 294 extending from the cable-side insulator 49 toward the motor-side insulator 41, and a second enclosure portion 295 extending from the motor-side insulator 41 toward the cable-side insulator 49.

Though in this embodiment the enclosure 293 includes the two enclosure portions, the number of enclosure portions is not limited to that of this embodiment. In one embodiment, the enclosure 293 may include a third enclosure portion (not shown), or at least one more enclosure portion.

In this embodiment, the first enclosure portion 294 and the cable-side insulator 49 are integrally-molded members, and the second enclosure portion 295 and the motor-side insulator 41 are integrally-molded members. The enclosure portions 294, 295 each have a cylindrical shape, and are made of an insulating hard material (more specifically an insulating resin material).

The second enclosure portion 295 is disposed between the first enclosure portion 294 and the exposed portions of the contacts 42, 50, and away from the exposed portions of the contacts 42, 50 and from the first enclosure portion 294.

Thus, a space is formed between the second enclosure portion 295 and the exposed portions of the contacts 42, 50, and a space is formed between the first enclosure portion 294 and the second enclosure portion 295.

By thus disposing the second enclosure portion 295 away from the exposed portions of the contacts 42, 50, and disposing the first enclosure portion 294 away from the second enclosure portion 295, a bent space (labyrinth space) is formed between the exposed portions of the contacts 42, 50 and the first enclosure portion 294. The space is U-shaped in a cross-sectional view of the contacts 42, 50 and the enclosures 294, 295.

In this embodiment, the diameter of a recessed portion 195 of the cable-side insulator 49 is larger than the diameter of a recessed portion 197 of the motor-side insulator 41. The inner diameter of the first enclosure portion 294 is equal to the diameter of the recessed portion 195, and the inner diameter of the second enclosure portion 295 is equal to the diameter of the recessed portion 197. In this embodiment, the interior surface 294*a* of the first enclosure portion 294 connects with the recessed portion 195, while the interior surface 295*a* of the second enclosure portion 295 connects with the recessed portion 197.

The front end 294*b* of the first enclosure portion 294 is located away from, and not in contact with the motor-side insulator 41. The front end 50*a* of the cable contact 50 projects toward the motor-side insulator 41 further outward than the front end 294*b* of the first enclosure portion 294. The front end 295*b* of the second enclosure portion 295 is located away from, and not in contact with the cable-side insulator 49. The front end 295*b* of the second enclosure portion 295 is located in the recessed portion 195.

According to this embodiment, the insulating enclosure 293, which surrounds the exposed portions of the cable contact 50 and the motor contact 42, can form a labyrinth space. Accordingly, the enclosure 293 can ensure an adequate insulation distance for the exposed portions, and can therefore prevent an electrical leakage accident.

Figure 11:
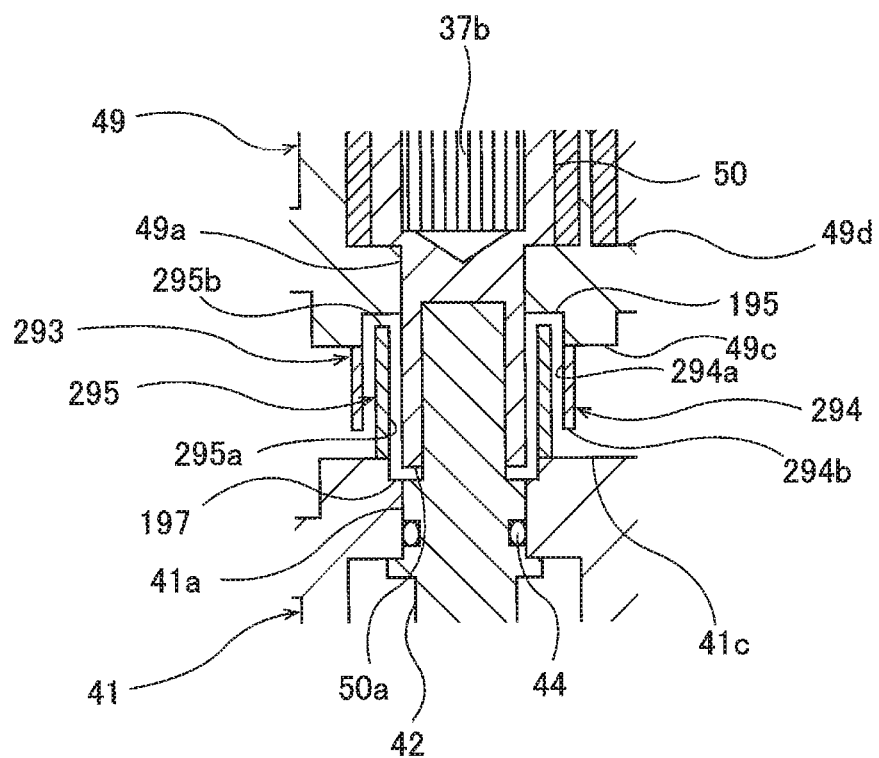
FIG. 11 is an enlarged cross-sectional view showing another embodiment of an enclosure.

FIG. 11 is an enlarged cross-sectional view showing another embodiment of the enclosure 293. In the embodiment shown in FIG. 11, the first enclosure portion 294 and the cable-side insulator 49 are comprised of separate members, and the second enclosure portion 295 and the motor-side insulator 41 are comprised of separate members. Thus, an electrical leakage accident can be securely prevented by simply adding the enclosure 293. Further, according to this embodiment, a change of the shape of the enclosure 293 or processing of the enclosure 293 can be performed with ease.

The enclosure portions 294, 295 may be made of a material different from the insulators 49, 41. In one embodiment, the enclosure portions 294, 295 may be made of a material having better insulating properties than the insulators 49, 41.

The first enclosure portion 294 and the second enclosure portion 295 may be bonded with an adhesive to the insulators 49, 41, respectively, or may be mounted by screw engagement to the insulators 49, 41, respectively. The enclosure portions 294, 295 can be securely mounted to the insulators 49, 41, respectively, in such a manner. The enclosure 293 can therefore ensure an insulating state.

In one embodiment, the enclosure portions 294, 295 are externally threaded, while the insulators 49, 41 are internally threaded; the enclosure portions 294, 295 threadably engage the insulators 49, 41, respectively.

In another embodiment, a male screw portion, extending toward the motor-side insulator 41, is formed on the exterior surface 49*c* of the cable-side insulator 49. A thread groove is formed on the outer surface of the male screw portion. A screw groove is formed in the inner surface of the first enclosure portion 294 so that the first enclosure portion 294 threadably engages the male screw portion of the cable-side insulator 49. Similarly, a male screw portion, extending toward the cable-side insulator 49, is formed on the exterior surface 41*c* of the motor-side insulator 41. A thread groove is formed on the outer surface of the male screw portion. A screw groove is formed in the inner surface of the second enclosure portion 295 so that the second enclosure portion 295 threadably engages the male screw portion of the motor-side insulator 41.

Figure 12:
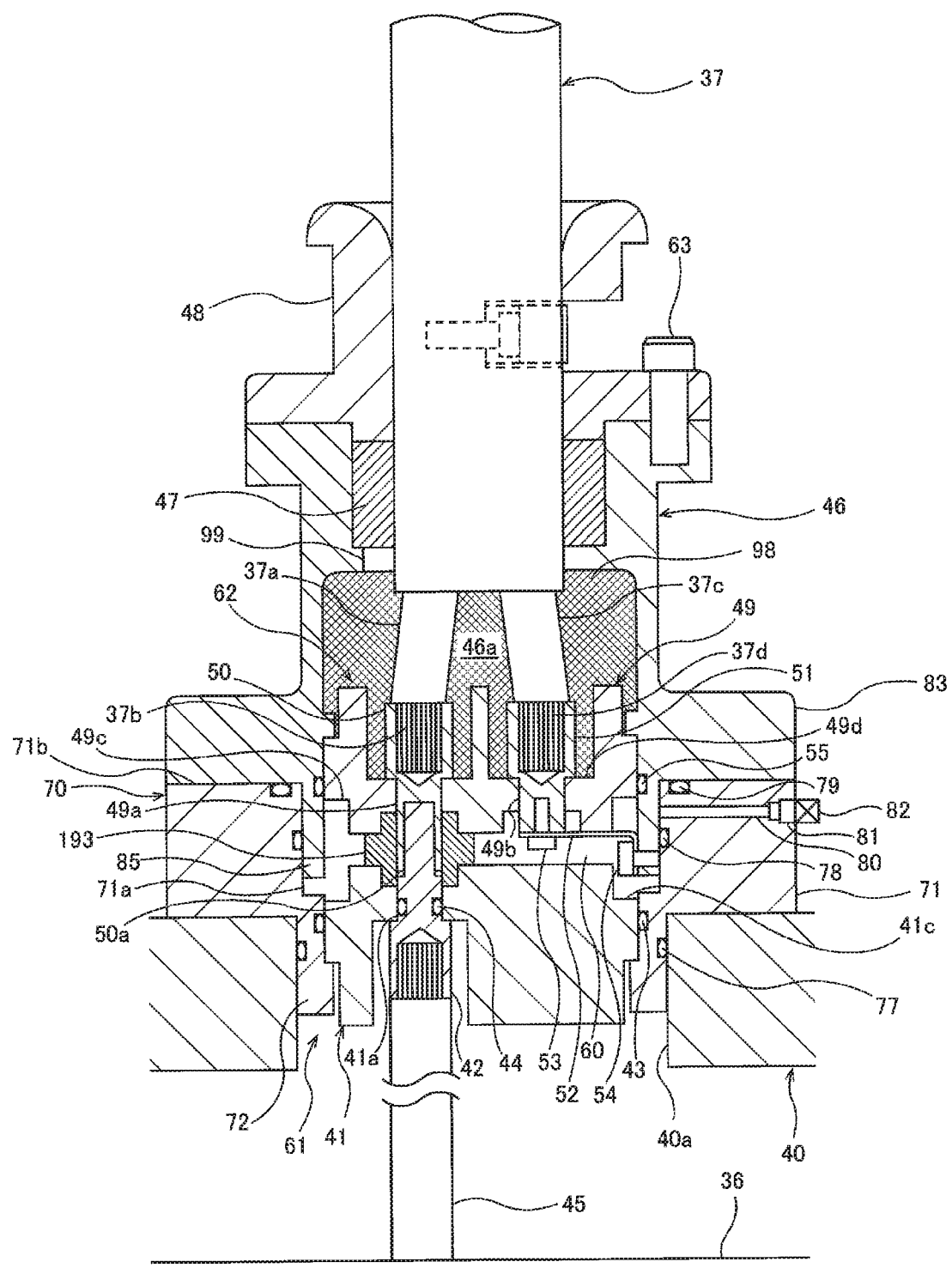
FIG. 12 is a cross-sectional view showing yet another embodiment of a waterproof connector.
Figure 13:
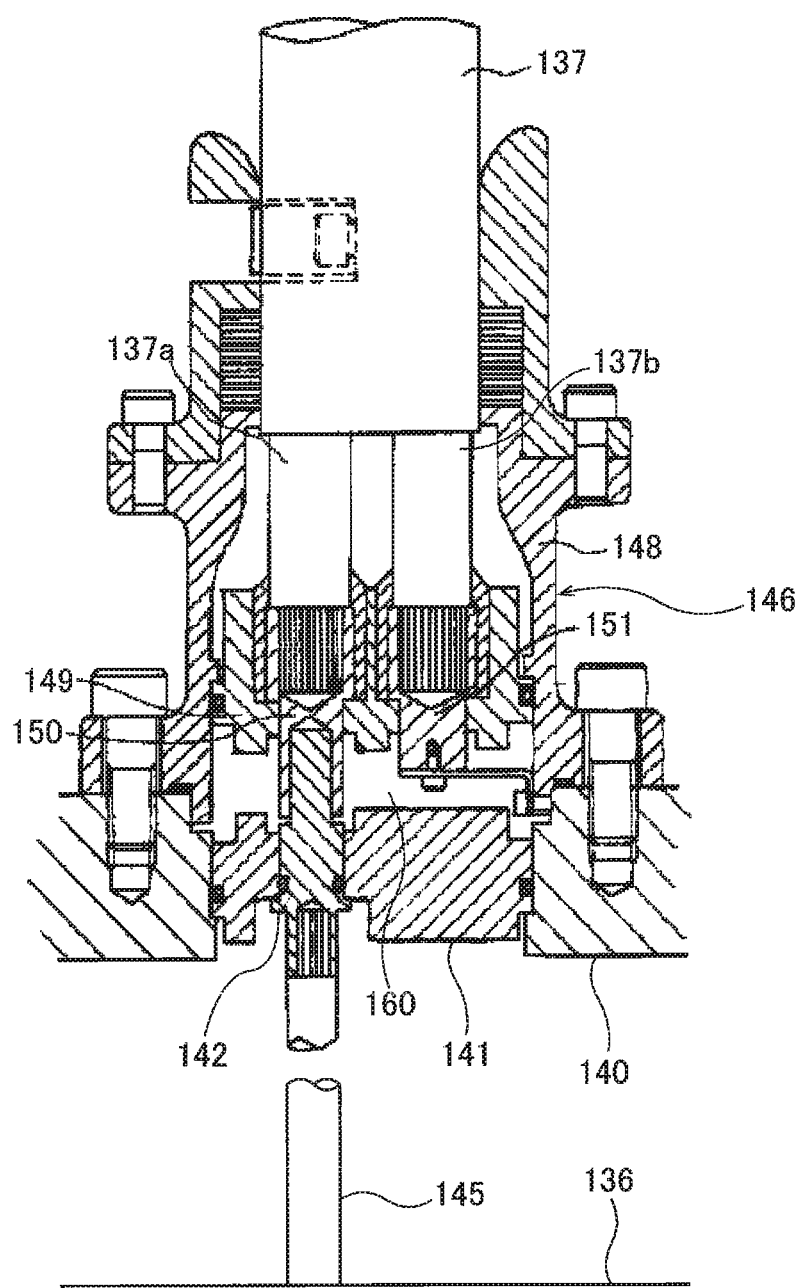
FIG. 13 is a diagram showing a connector-type submersible motor.

FIG. 12 is a cross-sectional view showing yet another embodiment of a waterproof connector. The construction and the operation of this embodiment, not particularly described here, are the same as those of the above-described embodiment, and a duplicate description thereof is omitted. The waterproof connector further includes a socket member (intermediate member) 70 disposed between the connector body 46 and the top plate 40. In this embodiment, the connector body 46, the cable gland 48 and the socket member 70 are collectively referred to as a conductive cover member. The connector body 46 is liquid-tightly coupled to the top plate 40 of the motor casing 35 via the socket member 70.

The shape of the socket member 70 can be determined relatively freely, and the socket member 70 can be processed relatively easily. According to this embodiment, the connector body 46 can be connected to the motor casing 35 (more specifically the top plate 40) merely by processing the socket member 70 without directly processing the motor casing 35.

The socket member 70 is liquid-tightly coupled to the opening 40*a* of the top plate 40, and the motor-side insulator 41 is liquid-tightly coupled to the socket member 70. An O-ring (sealing member) 77 is disposed between the socket member 70 and the top plate 40, and an O-ring (sealing member) 43 is disposed between the socket member 70 and the motor-side insulator 41. The O-ring 77 ensures the liquid-tightness between the socket member 70 and the top plate 40, and the O-ring 43 ensures the liquid-tightness between the socket member 70 and the motor-side insulator 41.

The connector body 46 has a flange portion 83 projecting from the lower end of the connector body 46. The flange portion 83 corresponds to the flange portion 57 of the above-described embodiment. The flange portion 83 has a cylindrical portion 85 projecting from the lower end of the flange portion 83. The cylindrical portion 85 is configured to engage the socket member 70. The front end of the cylindrical portion 85 projects toward the motor-side insulator 41 further outward than the front end 50*a* of the cable contact 50. The cylindrical portion 85 corresponds to the cylindrical raised portion 91 of the above-described embodiment.

The socket member 70 is composed of a flange portion 71 and a cylindrical portion 72 projecting from the lower surface of the flange portion 71. The flange portion 71 and the cylindrical portion 72 are constructed integrally. The flange portion 71 has a receiving hole (interior surface) 71*a* formed in the center of the flange portion 71. The cylindrical portion 85 and the receiving hole 71*a* are configured to engage each other.

The flange portions 71, 83 each have fastening holes (not shown) for insertion of fastening tools (not shown). The fastening holes are arranged in the circumferential direction of the flange portions 71, 83.

The connector body 46 is coupled to the socket member 70 such that the fastening holes of the connector body 46 are connected to the fastening holes of the socket member 70. Thereafter, the fastening tools are inserted into the fastening holes, and the fastening tools are tightened, whereby the connector body 46 is secured to the top plate 40 via the socket member 70.

An O-ring (sealing member) 78 is disposed between the cylindrical portion 85 of the connector body 46 and the receiving hole 71*a* of the flange portion 71 (i.e. the interior surface of the flange portion 71), and an O-ring (sealing member) 79 is disposed between the exterior surface 71*b* of the flange portion 71 and the flange portion 83 of the connector body 46. The O-rings 78, 79 ensure the liquid-tightness between the connector body 46 and the socket member 70.

An air passage hole 80, extending from the exterior surface 71*b* to the interior surface 71*a*, and a pipe thread 81 to which a high-pressure gas pipe is to be connected, are formed in the flange portion 71. The air passage hole 80 is usually plugged with a screw plug 82. The air passage hole 80 opens between the two O-rings 78, 79 of the socket member 70. Such a construction enables a test to check whether the liquid-tightness is maintained: whether or not the liquid-tight sealing portions are working well can be checked by injecting a high-pressure gas through the air passage hole (air passage) 80.

When mounting the connector body 46 to the socket member 70, the cylindrical portion 85 comes into contact with the flange portion 71 before the contacts 42, 50 come into contact with each other: the front end of the cylindrical portion 85 projects toward the motor-side insulator 41 further outward than the front end 50*a* of the cable contact 50, and the exterior surface 71*b* of the flange portion 71 extends toward the cable-side insulator 49 further outward than the front end of the motor contact 42. Thus, the cylindrical portion 85 can contact the flange portion 71 before the cable contact 50 comes into contact with the motor contact 42. When detaching the waterproof connector, the cylindrical portion 85 leaves the flange portion 71 after the cable contact 50 leaves the motor contact 42. Thus, upon connection of the waterproof connector, the earth connection is made prior to connection of the contacts 42, 50, while upon detachment of the waterproof connector, the earth connection is disconnected after separation between the contacts 42, 50. This can prevent the occurrence of an operator's electrical shock accident.

In this embodiment, the space 46*a* in the connector body 46 is filled with an insulating resin 98, and the cables 37*a*, 37*c* and their exposed portions 37*b*, 37*d* are completely covered with the resin 98. A groove 99 for poring the resin 98 into the space 46*a* is formed in the interior surface of the connector body 46. The provision of the groove 99 makes it possible fill the resin 99 into the space 46*a* with the cable 37 set in the waterproof connector.

In this embodiment, the insulating enclosure 193 is disposed in the connecting portion space 60 formed between the cable-side insulator 49 and the motor-side insulator 41, and surrounds the exposed portions of the cable contact 50 and the motor contact 42, located in the connecting portion space 60. Though not shown diagrammatically, the enclosure 293 shown in FIG. 9 may be disposed in the connecting portion space 60.

Though the waterproof connectors of the above-described embodiments are applied to a submersible motor, the application of a waterproof connecter according to the present invention is not limited to a submersible motor. A waterproof connecter according to the present invention can be applied also to an electric/electronic device which is to be used or may possibly be used in or near water. For example, a waterproof connecter according to the present invention can be applied to a power supply section of a ship for underwater work, or a vehicular power cable/control cable connecting portion, and can achieve the excellent effects.

While the present invention has been described with reference to the embodiments thereof, it will be understood that the present invention is not limited to the particular embodiments described above, but it is intended to cover changes and modifications within the inventive concept.

INDUSTRIAL APPLICABILITY

The present invention is applicable to a high-voltage submersible motor and a waterproof connector for use in the submersible motor.

REFERENCE SIGNS LIST 36 motor body
37 cable
37*a* power cable
37*b*, 37*d* exposed portion
37*c* earth cable
38 control cable
40 top plate
41 motor-side insulator (motor-side insulating member)
42 motor contact
45 lead wire
46 connector body
49 cable-side insulator (cable-side insulating member)
50 cable contact
51 earth contact
52 earthing member
60 connecting portion space (enclosed space)
70 socket member (intermediate member)
80 resin injection hole
82 plug
93, 98 resin
99 groove
180 air vent hole
182 plug member
193, 293 enclosure
193*a* interior surface
193*b* exterior surface
193*c* one end
193*d* the other end
194, 196 projecting portion
195, 197 recessed portion
294 first enclosure portion
295 second enclosure portion

The invention claimed is:
1. A submersible motor comprising:
a motor body;
a power cable for supplying power to the motor body;
a cable contact electrically connected to the power cable;
a cable-side insulating member to which the cable contact is liquid-tightly coupled;
a motor contact connected to the cable contact;
a motor-side insulating member to which the motor contact is liquid-tightly coupled; and
an insulating resin that fills an enclosed space formed between the cable-side insulating member and the motor-side insulating member, wherein a connecting portion of the cable contact and the motor contact is covered with the resin.

2. The submersible motor according to claim 1, further comprising a conductive cover member to which the cable-side insulating member is liquid-tightly coupled, the conductive cover member having a resin injection hole communicating with the enclosed space.

3. A waterproof connector comprising:
a cable contact which is electrically connectable to a power cable;
a cable-side insulating member to which the cable contact is liquid-tightly coupled;
a motor contact which is connectable to the cable contact;
a motor-side insulating member to which the motor contact is liquid-tightly coupled; and
an insulating resin that fills an enclosed space formed between the cable-side insulating member and the motor-side insulating member, wherein a connecting portion of the cable contact and the motor contact is covered with the resin.

4. The waterproof connector according to claim 3, further comprising a conductive cover member to which the cable-side insulating member is liquid-tightly coupled, the conductive cover member having a resin injection hole communicating with the enclosed space.

5. A submersible motor comprising:
a motor body;
a power cable for supplying power to the motor body;
a cable contact electrically connected to the power cable;
a cable-side insulating member to which the cable contact is liquid-tightly coupled;
a motor contact connected to the cable contact;
a motor-side insulating member to which the motor contact is liquid-tightly coupled; and
an insulating enclosure disposed in an enclosed space formed between the cable-side insulating member and the motor-side insulating member, wherein the enclosure surrounds those exposed portions of the cable contact and the motor contact which are located in the enclosed space.

6. The submersible motor according to claim 5, wherein one end of the enclosure is detachably connected to the cable-side insulating member, while the other end of the enclosure is detachably connected to the motor-side insulating member.

7. The submersible motor according to claim 5, wherein the enclosure has a labyrinth structure comprising at least a first enclosure portion extending from the cable-side insulating member toward the motor-side insulating member, and a second enclosure portion extending from the motor-side insulating member toward the cable-side insulating member.

8. The submersible motor according to claim 5, further comprising a conductive cover member to which the cable-side insulating member is liquid-tightly coupled, the enclosure having an exterior surface being away from the conductive cover member.

9. A waterproof connector comprising:
a cable contact which is electrically connectable to a power cable;
a cable-side insulating member to which the cable contact is liquid-tightly coupled;
a motor contact which is connectable to the cable contact;
a motor-side insulating member to which the motor contact is liquid-tightly coupled; and
an insulating enclosure disposed in an enclosed space formed between the cable-side insulating member and the motor-side insulating member, wherein the enclosure surrounds those exposed portions of the cable contact and the motor contact which are located in the enclosed space.

10. The waterproof connector according to claim 9, wherein one end of the enclosure is detachably connected to the cable-side insulating member, while the other end of the enclosure is detachably connected to the motor-side insulating member.

11. The waterproof connector according to claim 9, wherein the enclosure has a labyrinth structure comprising at least a first enclosure portion extending from the cable-side insulating member toward the motor-side insulating member, and a second enclosure portion extending from the motor-side insulating member toward the cable-side insulating member.

12. The waterproof connector according to claim 9, further comprising: a conductive cover member to which the cable-side insulating member is liquid-tightly coupled, the enclosure having an exterior surface being away from the conductive cover member.

* * * * *